Figure 1:
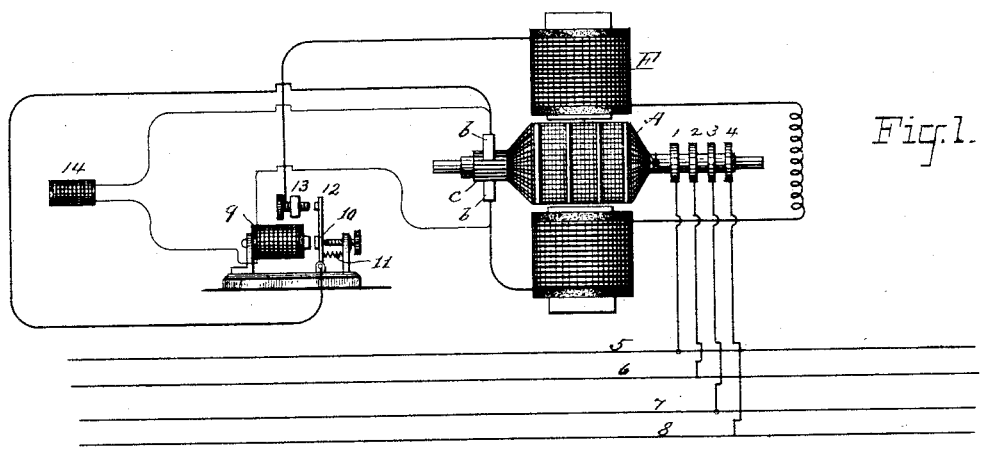

(No Model.) 2 Sheets—Sheet 1.
C. S. BRADLEY.
ALTERNATING CURRENT ELECTRIC MOTOR.

No. 404,466. Patented June 4, 1889.

WITNESSES:

Charles S. Bradley, INVENTOR

BY

ATTORNEYS (No Model.) 2 Sheets—Sheet 2.

C. S. BRADLEY.
ALTERNATING CURRENT ELECTRIC MOTOR.

No. 404,466. Patented June 4, 1889.

WITNESSES:

Charles S. Bradley
INVENTOR,

BY
McFighert Worthington
ATTORNEY

UNITED STATES PATENT OFFICE.

CHARLES S. BRADLEY, OF YONKERS, NEW YORK.

ALTERNATING-CURRENT ELECTRIC MOTOR.

SPECIFICATION forming part of Letters Patent No. 404,466, dated June 4, 1889.

Application filed February 18, 1889. Serial No. 300,279. (No model.)

*To all whom it may concern:*

Be it known that I, CHARLES S. BRADLEY, a citizen of the United States, residing at Yonkers, in the county of Westchester and State of New York, have invented certain new and useful Improvements in Alternating-Current Electric Motors; and I do hereby declare the following to be a full, clear, and exact description of the invention, such as will enable others skilled in the art to which it appertains to make and use the same.

This invention relates to devices for application to alternating-current electric motors of the differential-phase type, wherein the armature is caused to rotate by the rotation of the polar line set up therein by the difference of phase of the currents supplied to said armature. In motors of this type it has been found that where the field-magnet is directly energized by current flowing through the coils upon it, which seems to be necessary in order to obtain an adequate mechanical output from the motor, it is practically impossible to get the armature up to normal speed if the field-magnets are energized at the moment of starting. I have discovered that if the field-magnet circuit be left open at the moment of starting the armature by the alternating currents and so continued until the armature has reached its normal speed the field-magnet circuit may then be closed and the full mechanical output obtained from the motor without causing it to fall back in speed, as would be the case were the field-magnet circuit closed at the moment of starting. This may be explained in various ways. If we take a given pole of the field-magnet and consider that a rotating pole of the armature, which we will suppose an N pole, is approaching the said field-magnet pole the latter would become an S pole and strongly attract the said armature-pole, and motion of the armature would be produced; but if the field-magnet were surrounded with its usual coils closed the setting up of magnetism in the given field-pole would cause an induced current to flow in the coil, which would partially or quite annul the polarity of said S pole of the field-magnet. Therefore the result of these two opposing tendencies is that the armature will not start if the field-magnet circuit is closed.

In a pending application, Serial No. 288,681, filed October 20, 1888, I have shown such a motor in connection with a switch in the field-magnet circuit intended for manual operation; but in the commercial and widespread use of these motors, on account of the want of technical knowledge on the part of those having them in charge, it is of the utmost importance to have all such switching operations performed automatically and to have their performance dependent upon the proper conditions, so that the closing of the field-circuit will not take place until the very moment it is desirable that it should be closed.

To these and other ends, therefore, my invention consists in the arrangement and combination of devices, substantially as hereinafter fully described and claimed.

In the drawings which form part of this specification Figure 1 is a diagrammatic view, showing a differential-phase alternating-current electric motor arranged for self-excitation and having an automatic switch adapted to close its field-circuit at the proper moment. Figs. 2, 3, 4 and 5 are modifications showing various ways in which the fundamental idea of an automatic switch may be embodied in accordance with my invention.

Referring to Fig. 1, A is the armature of the alternating-current motor, and in this particular instance it is shown as a drum-armature with continuous winding, from which at four equidistant points connections are made, respectively, to the insulated contact-rings 1, 2, 3, and 4, which are connected by suitable brushes to the respective mains 5, 6, 7, and 8. Mains 5 and 6 supply an alternating current and mains 7 and 8 supply another alternating current which, in this particular instance differs in phase from the former by one-quarter of a wave-length. Armature A at the other end is provided with a commutator *c* and brushes *b* in the usual manner, for taking off a continuous direct current into any circuit connected with such brushes in accordance with the principles set forth in my patent, No. 390,439, dated October 2, 1888. Whenever a current is admitted from the circuits 5, 6, 7, and 8 into the armature A, if the field-magnet circuit is open, the armature will immediately start into motion and gradually rise in speed until it substantially synchronizes with the generator, supplying currents to the circuits 5, 6, 7, and 8; but if the field-magnet circuit is closed the armature will not start and rise to its normal speed. I therefore proceed as follows: I arrange an electro-magnet 9 in a suitable position and place in front of it a pivoted armature 10, having a retractile spring 11, which may to advantage be adjustable, and on the arm which carries the armature 10 I arrange a contact 12 on the side toward the magnet 9. In front of such contact I arrange a corresponding contact 13, as shown. The field-magnet circuit is closed at all points except the contacts 12 and 13, and my object is to accomplish the closing of these contacts at the moment when the armature A has arrived at its normal speed. The electro-magnet 9 is included in a branch circuit taken from the brushes $b$, and including by preference a choke-coil 14, which is constructed to have a high coefficient of self-induction and moderate resistance. This, however, is not essential to the performance of the apparatus. Thus constructed the action is as follows: The armature A being at rest, the two alternating currents entering the circuit of the armature cause a rotation of the poles of the latter and set it in motion, and at the same time, by reason of the stationary brushes $b$, an alternating current passes through the branch circuit, including the coils of magnet 9. This single alternating current is due to and corresponds with the rotation of the N and S poles set up in the armature A; but the current is not of such character as to cause the attraction of the armature 10 against the force of spring 11. As the armature rises in speed, the rotation of the poles N and S of the armature becomes slower and slower, the waves in the branch circuit become longer and longer and straighter and straighter, and the relay hammers slightly on its back-stop until finally, when the speed has reached its normal rate, the current passing through the coils of the magnet 9 is a continuous current in one direction, and the armature 10 is attracted, causing the contacts 12 and 13 to close firmly together and remain there so long as the armature A is rotating at its normal speed. It is thus readily seen that the field-magnet circuit remains open until the armature has arrived at its normal speed, and at that instant the field-magnet circuit is closed and the motor is in condition to exert a maximum mechanical energy.

Figure 2:
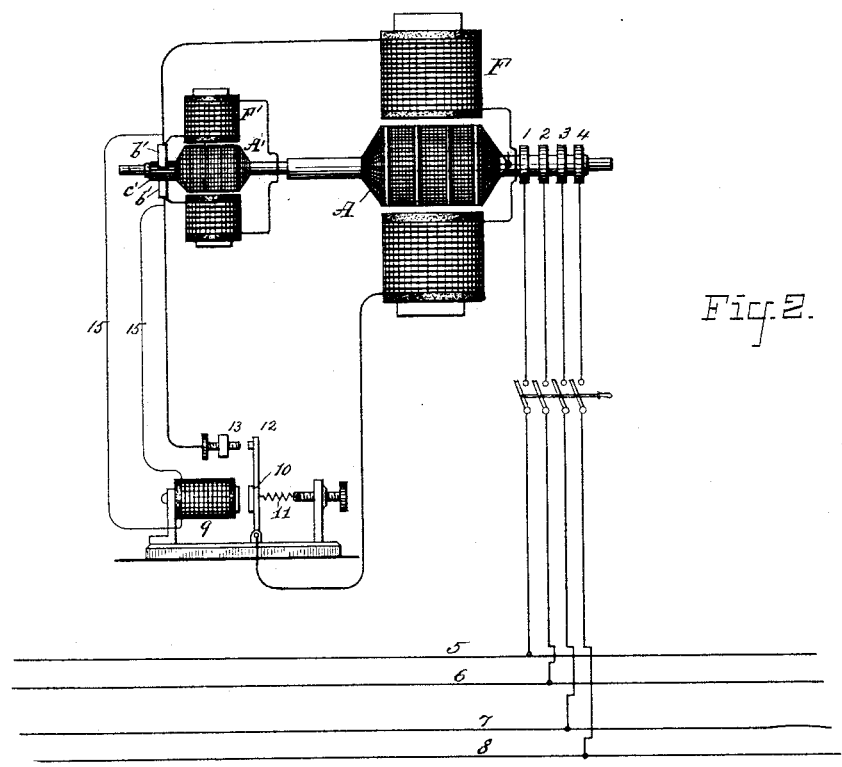

The modification shown in Fig. 2 differs from the foregoing only in the fact that, instead of making the motor self-exciting, I place on its shaft a continuous-current armature A′, having the commutator $c'$ and brushes $b'$. The field-magnet F′ of the small generator is in this case preferably shunt-wound and its terminals are directly connected to the brushes $b'$. Another shunt or derived circuit 15 from the terminals of the small generator is taken to and includes the coils of the electro-magnet 9, the same as in the form shown at Fig. 1. The field-magnet F of the motor is supplied with current from the small generator through its brushes $b$, and energizing-circuit of the motor F is arranged to be opened or closed at the contacts 12 and 13, the same as in Fig. 1. A retractile spring 11 is likewise used to hold the armature 10 away from the magnet 9. The operation is as follows: The full magnet-circuit of the motor being normally open, the armature supplied from the mains 5 6 and 7 8 starts rotating and gradually rises in speed until its normal rate has been reached. At the same time the small generating-armature A′ is set in rotation, and the potential in the branch circuit 15 gradually rises until it overcomes the force of the spring 11, which is adjusted to yield only when the potential is a maximum due to normal speed of rotation of the armature A. Thereupon the contacts 12 and 13 close and the motor assumes its normal and proper condition.

Figure 3:
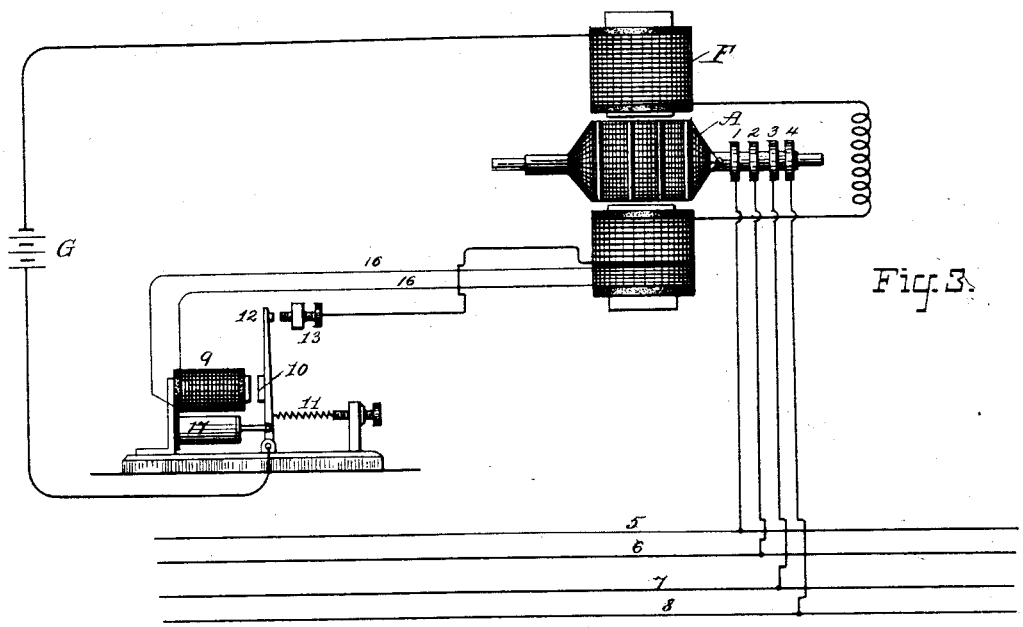

In the modification shown at Fig. 3 the automatic closing of the field-magnet circuit is effected in a slightly-different manner. On one or more of the cores of the field-magnet F of the motor I wind a sufficient number of convolutions of insulated wire, forming, with coils of the electro-magnet 9, a circuit, which I designate by the numeral 16. In this modification the pivoted arm carrying the armature 10 of the circuit-closing magnet is provided with a dash-pot 17, a retractile spring 11, and the contacts 12 and 13 are reversed in position, so as to be closed upon the retraction of the armature 10. Upon admitting current from the mains 5 6 and 7 8 into the armature A the rotation of the poles of the latter sets up variations of magnetism in the core or cores of the field-magnet F, and these changes of magnetism induce currents in the circuit 16 which are strongest when the armature A is lowest, because at that time the rotation of the polar lines is most rapid and the inductive effect on the circuit 16 greatest. The armature 16 is therefore attracted at the first admission of current to the armature A and the circuit is open at the contacts 12 and 13. As the armature of the motor now rises in speed the attracted power of the electro-magnet 9 gradually weakens, and by the adjustment of the spring 11 it is so arranged that when this attraction has reached a certain minimum dependent upon the speed of the motor-armature A the spring 11 will overcome the attraction of the magnet 9 and pull the armature 10 away, thereby closing the contacts 12 and 13 and sending current through the field-magnet F from any suitable form of generator, such as the battery G, shown in the drawings. When this exciting-circuit is closed, of course the magnetism in the field-magnet F is a constant, and no further inductive effect is produced in the circuit 16.

Figure 4:
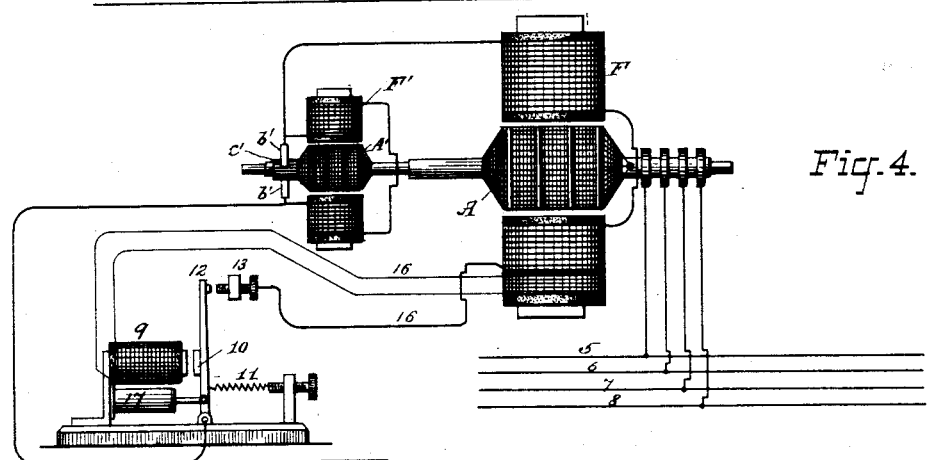

In the modification shown at Fig. 4 the general arrangement is substantially the same, the inductive circuit 16 being the means by which the automatic closing of the exciting-circuit is realized; but instead of the generator 6, (shown in Fig. 3,) I have shown the separate exciter consisting of the field-magnet F' and the armature A', which is fixed on the shaft of the motor. The small generator A' F' thus takes the place of the generator G. (Shown in Fig. 3.)

Figure 5:
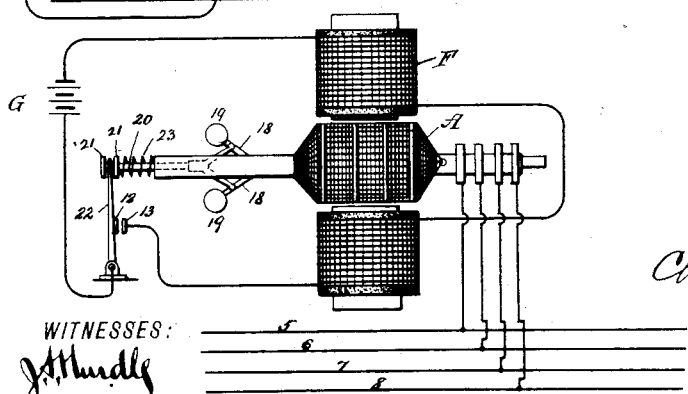

In the modification shown at Fig. 5 the action is mechanical and the closing of the circuit of the field-magnet F of the motor is brought about directly by the speed of the motor acting mechanically. This is accomplished by means of centrifugal devices on the shaft represented by the arms 18, weights 19, connected to the spindle 20, which is provided with the collars 21, between which is placed the lever 22, having the circuit-closing contacts 12 and 13. A spring 23 is placed around the spindle 20 in order to force open the contacts 12 and 13 and hold them open at all times except when the speed of the armature A has risen to such point that the centrifugal movement of the weights 19 overcomes the tension of the spring to such extent as to bring the contacts 12 and 13 together, whereupon the field-magnet circuit is closed and the motor is brought to its proper condition, as hereinbefore described. Obviously the same arrangement of mechanical devices for this purpose may be greatly modified without departing from the spirit of my invention, as may also the electrical devices I have shown.

I claim as my invention—

1. In an alternating-current electric motor having an induced field-circuit, the combination therewith of an automatic switch adapted to close said field-circuit on arrival of the armature at its normal speed.

2. In an alternating-current electric motor having an induced field-circuit, the combination therewith of an automatic switch adapted to close said field-circuit and means for closing said switch on arrival of the armature at its normal speed.

3. In an alternating-current electric motor having an induced field-circuit, the combination therewith of a switch adapted to close the field-circuit, means for holding said switch open till the armature arrives at its normal speed, and means for thereupon closing said switch automatically.

4. In an alternating-current electric motor having a rotary armature and its field-magnet provided with an energizing-circuit, the combination therewith of a switch in said field-circuit and means for automatically closing said circuit, dependent for operation upon the armature attaining its normal speed.

5. In an alternating-current differential-phase electric motor having a rotary armature and its field-magnet provided with an energizing-circuit, the combination therewith of a switch in said field-circuit and means for automatically closing said circuit, dependent for operation upon the armature attaining its normal speed.

6. In an alternating-current electric motor comprising a stationary and a movable member, one of which has polar rotation set up in it by direct action of the operating-current and the other member has an energizing-circuit, the combination, with the said energizing-circuit, of a switch for opening and closing the same, and means for automatically closing said switch controlled by the speed of said movable member of the motor.

In testimony whereof I affix my signature in presence of two witnesses.

CHARLES S. BRADLEY.

Witnesses:
T. J. McTIGHE,
M. E. HOLLAND.